P. R. OVERLIN.
TORPEDO GUARD.
APPLICATION FILED AUG. 9, 1917.
1,249,470.
Patented Dec. 11, 1917.
3 SHEETS—SHEET 1.
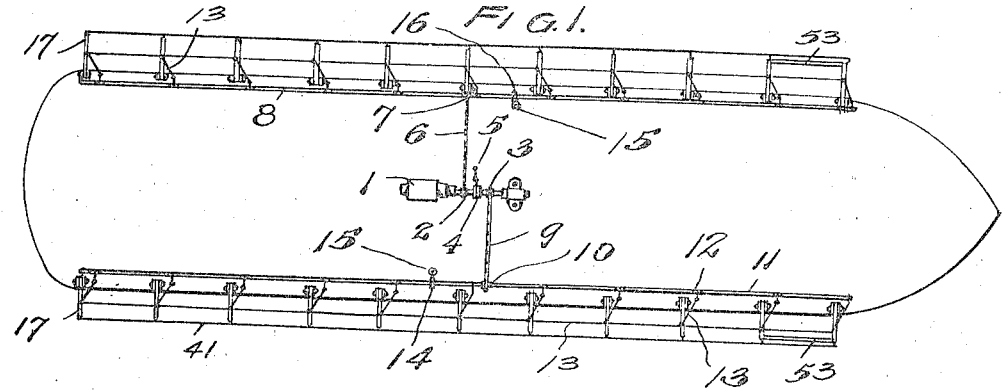
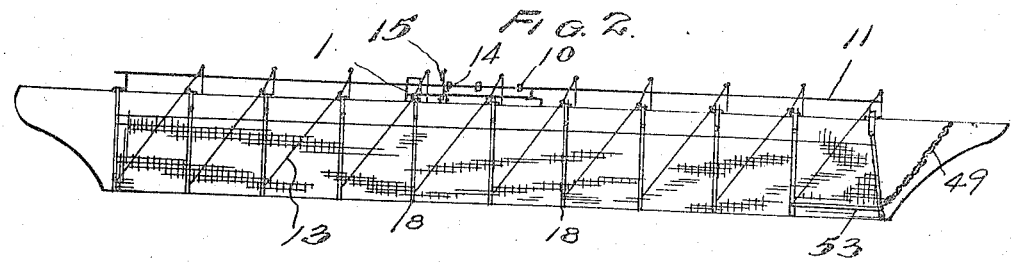
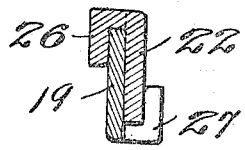
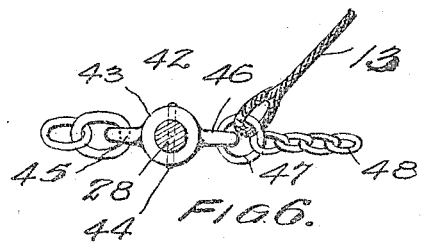
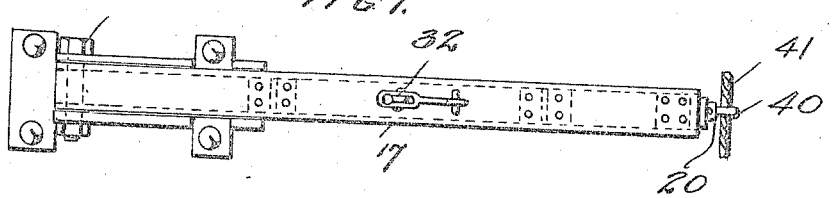
Inventor
Pleasant R. Overlin
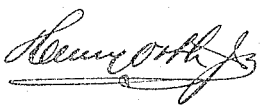
Attorney

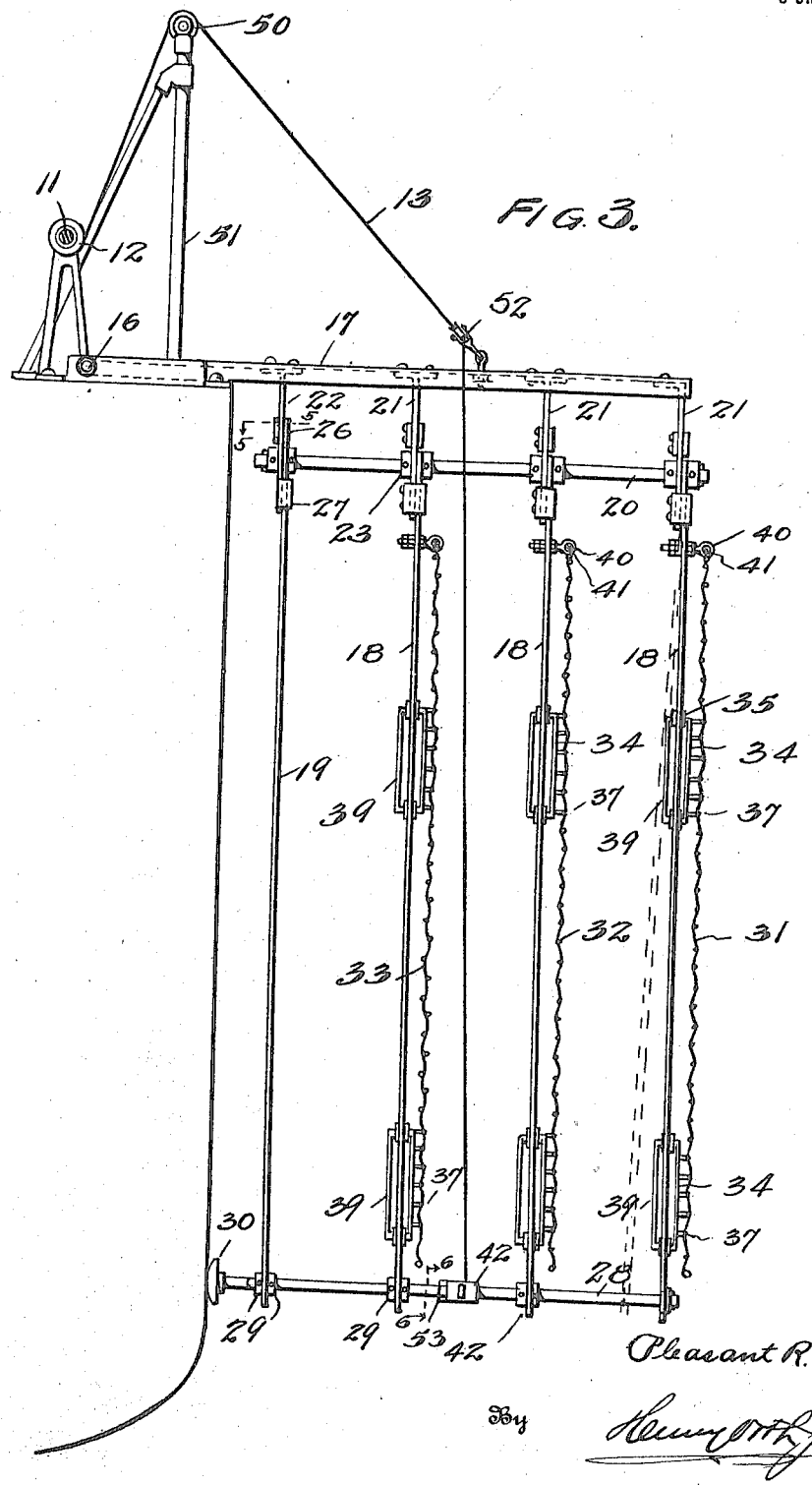

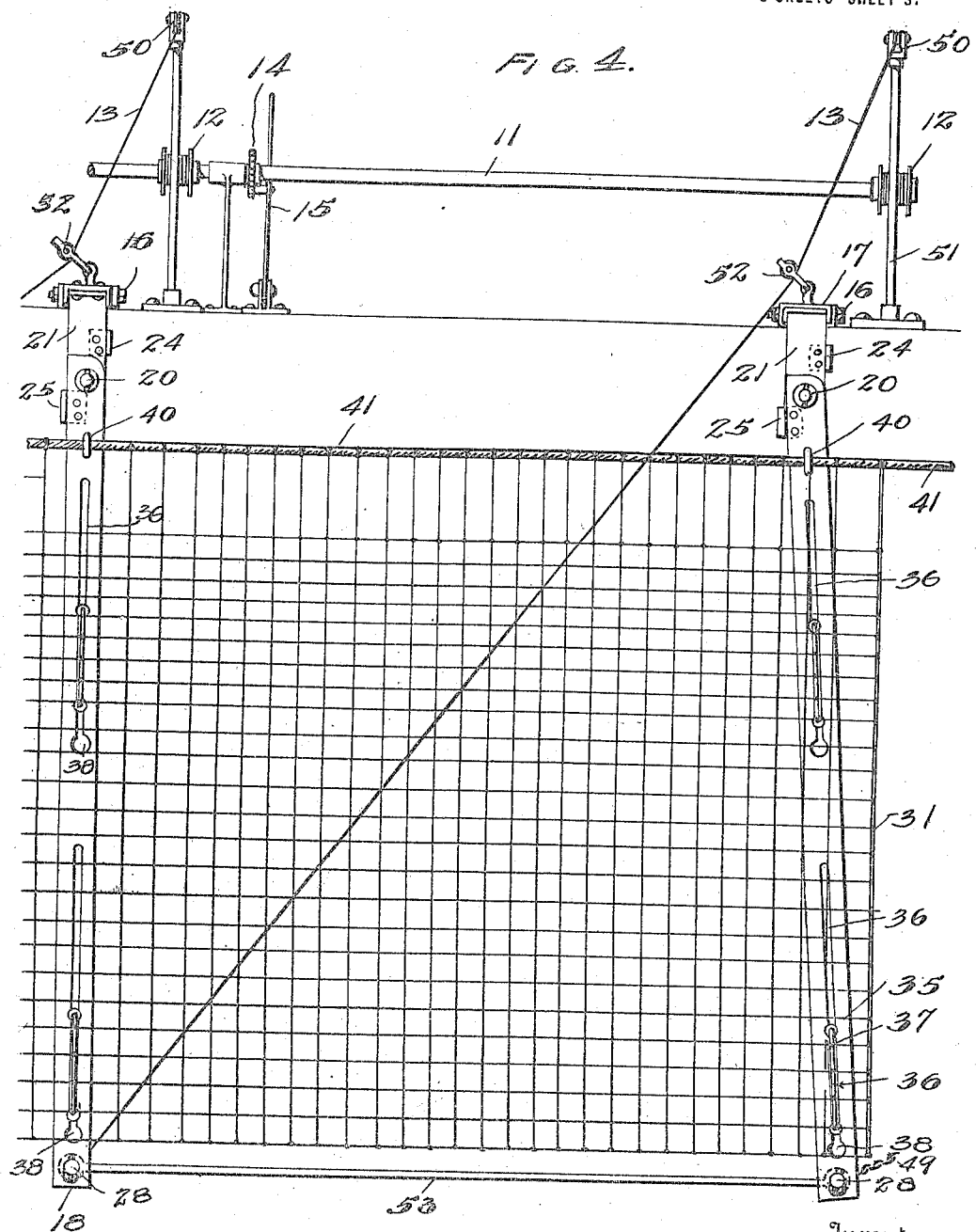

UNITED STATES PATENT OFFICE.

PLEASANT R. OVERLIN, OF EVANSVILLE, INDIANA.

TORPEDO-GUARD.

1,249,470.

Specification of Letters Patent.     Patented Dec. 11, 1917.

Application filed August 9, 1917. Serial No. 185,401.

*To all whom it may concern:*

Be it known that I, PLEASANT R. OVERLIN, a citizen of the United States, residing at Evansville, Vanderburg county, Indiana, have invented certain new and useful Improvements in Torpedo-Guards; and I do hereby declare the following to be a full, clear, and exact description of the invention, such as will enable other skilled in the art to which it appertains to make and use the same, reference being had to the accompanying drawings, and to letters or figures of reference marked thereon, which form a part of this specification.

My invention relates to torpedo guards, and has for its object to provide one or more guards in the form of nets with means for gathering the nets together and lifting them from the water. These guards or nets depend parallel to the sides of the ship and are secured to a depending carrier or carriers hinged or pivotally secured to out-rigger arms projecting from the ship, said out-rigger arms, as well as the depending arms, being raised by suitable mechanism, whereby the net or nets may be gathered and raised clear of the deck of the ship.

In order that my invention may be more fully understood, reference will be made to the accompanying drawings, in which like parts are similarly designated, and in which—

Figure 1 is a plan view, showing the general arrangement.

Fig. 2 is a side elevation thereof.

Fig. 3 is a transverse section showing a plurality of net carrying arms depending from an out-rigger arm.

Fig. 4 is a front elevation of a pair of net supports and out-rigger arms.

Fig. 5 is a cross-section of the latching means for the interior braces on line 5—5 of Fig. 3.

Fig. 6 is a section on line 6—6 of Fig. 3.

Fig. 7 is a plan view of one of the out-riggers.

At any convenient place on the deck of a ship is located an engine 1, having a pair of loose driving sprocket wheels 2 and 3. A clutch member 4, moved into engagement with either the sprocket wheel 2 or sprocket wheel 3 by means of a lever 5, separately actuates two shafts, 8 and 11. The sprocket wheel 2 connects by means of a chain 6 to a sprocket wheel 7 on a line shaft 8 on one side of the ship, and the sprocket wheel 3 connects by chain 9 to a sprocket wheel 10 on a line shaft 11 on the other side of the ship.

These line shafts 8 and 11 each carry a number of winding drums 12 to which are attached ropes 13, whose function is to first cause the gathering of the nets, and then to raise them, if desired, above the level of the deck.

Each line shaft is provided with a ratchet wheel 14 and a lever-actuated pawl 15, whereby the line shafts 8 and 11 may be held in any position, or may be quickly released independently of the engine, to drop the guard nets.

The weight of the guard netting and the out-rigger arms is sufficient to cause the automatic positioning of the nets when the ratchet wheel 14 is released. The clutch member 4 is of that type of clutch which is spring-held in neutral position.

The engine is only used for gathering the nets and raising the out-rigger arms, for which purpose the clutch 4 is first thrown into engagement with one of the sprocket wheels 2, 3, and then with the other.

In this manner the guard nets on one side of the vessel are gathered, or gathered and raised, and then those on the other side of the vessel are gathered, or gathered and raised.

Hinged on the deck of the vessel at 16, and a few feet back from the side of the vessel, I provide out-rigger arms 17, projecting a number of feet from the side of the vessel, and each of these arms is provided with depending, spaced torpedo guard carriers 18 and a brace 19.

These guard carriers 18 are pivotally mounted on a rod 20, held in depending members 21 and 22, and are provided with spacing washers 23, or equivalent devices.

The depending members 21 are provided with stops 24 and 25, one (24) above, and the other (25) below the hinged rod 20 on opposite edges of the depending member 21, which operate as stops to limit the swing of the carriers 18 in two directions; that is to say, the stop 24 limits the movement of the carrier 18 to horizontal position, while the stop 25 limits the movement of the carrier 18 to its vertical position, so that each carrier has a movement through a quarter of a circle, or thereabout.

The brace 19 is provided with an upper stop 26 and the depending member 22 is provided with a lower stop 27. These stops are similar to those 24, 25, but differ therefrom in that they are hook-shaped and hook over the edges of the co-acting members, so as to prevent the brace 19 from having sidewise movement.

Passing through the lower ends of the carriers 18 and of the brace 19, is a shaft or rod 28 provided with spacing collars 29 similar to the collars 23 on the upper shaft 20; the lower end of the outermost carrier is free to move or to be deflected toward the body of the boat, and therefore slides on the rod 28. The rod 28 for the front set of carriers is provided with a buffer 30, for resting against the side of the ship, to assist in holding the set of carriers away from the side of the ship.

Stretched between the carriers of the several out-rigger arms are torpedo guards in the form of nets, the one on the outermost inwardly deflectable carriers being a net of tarred cotton rope 31; the guards 32, connected to the middle carriers also being of tarred cotton rope, but of smaller mesh than the mesh of 31; and the inner guard 33 is a chain net having a mesh of suitable size. The brace 19 is not provided with a net unless desired.

These guard nets are not directly secured to the carriers 18, but are secured to rods 34, preferably, but not necessarily, two to each carrier, one near the upper end and the other near the lower end of the carrier.

These rods 34 are secured to pairs of rollers 35, which rollers are slidable in slots 36, Fig. 4, and each of these rods 34 is provided with eyes 37 to which the nets may be tied, or secured in any suitable manner. Each slot 36 is provided with an enlarged circular lower end 38 of sufficient size to permit the insertion of a roller 35 therethrough, so that its body portion will be guided in the slot, and the rollers are held in the slots above the enlarged ends by the nets to which their rods 34 are secured.

In order to rigidly connect the pairs of rollers together, the bars 34 are supplemented at the back of each carrier, by a like bar 39, so that a pair of rollers 35, thus connected, will move as a unit in the slot.

Near the top of each carrier 18 is an eye 40 through which is passed a carrier rope 41 from which the nets are mainly supported, and to which they are attached in any well known manner.

Each rod 28 is provided at or near its middle with a connection 42, more clearly shown in Fig. 6. This connection comprises a sleeve 43 secured by a pin 44 to the shaft 28, and has two ears, 45 and 46; the ear toward the front of the boat is provided with a ring 47, to which is spliced or otherwise connected the lifting rope 13, and also chains 48 that connect the several carriers or sets of carriers (when there is more than one carrier or outrigger, as shown) together at their lower ends; and a like chain 49 is connected to the front set of carriers and to the prow of the boat. These chains are of such length that when the carriers are in the water, that is to say when they are in vertical position, the chains will be taut and operate to relieve the pressure on the locking lugs 24, 25, and 26, 27, due to the forward motion of the boat through the water.

All the carriers operate to swing forward in rising, to gather the nets, and in order to do this ropes 13 are provided. These ropes 13 pass from the drums 12 over elevated guide pulleys 50 on stationary supports 51 at or near the sides of the vessel. These ropes then pass over pulleys 52 on the out-riggers 17 and thence to the lower end of the set of carriers next behind to the connecting ring 47, consequently all the outriggers except the last, or rearmost, will be provided with such ropes. The rope 13 passing over the pulley 52 on the foremost out-rigger 17 will thus connect to the bottom of the second set of carriers, and in order to provide means for raising the front set of carriers I connect the front set of carriers to the second set of carriers by a link 53, the two ends of said link passing around the rods 28 of the first and second set of carriers, so that when the second set of carriers is raised by the ropes 13, the link 53 will push the front set of carriers to horizontal position, and this position is attained by causing the engine to operate shaft 11 and winding drums 12, thus causing a pull on the several ropes 13 on one side of the ship, and raising the several sets of carriers to horizontal position. After this horizontal position has been attained, the carriers will have gathered their nets into a horizontal position above the water, in which position they may be held by the ratchet and pawl 14, 15, while, if it be desired to raise them above the level of the deck, it will simply be necessary to continue the rotation of the line shaft, whereupon all of the out-riggers will be caused to move about their hinge pins 16, and lift the gathered nets clear of the deck.

This second lift, clear of the deck, is facilitated by so spacing the out-riggers from one another that when the carriers are lifted to horizontal position, the lower end of one carrier will engage under the upper end of the next forward set of carriers, so that when the ropes 13 are pulled for the second lift, all the carriers will lift as a unit.

The outermost carrier 18 is loosely connected to the shaft 28, so that when a torpedo strikes the net 31 this carrier will yield and move inward along the rod 28, and said carrier is preferably made of a material capable of yielding to the extent required.

As the guard carriers rise or are swung forward, the chain and nets begin to gather or collapse, and they are free to move along the carriers by reason of being attached to the rods 34 connected to the rollers 35, so that no tension will be brought on the meshes of the nets or chain during their gathering, said rods 34 being free to travel lengthwise of their slots in accordance with the take-up or gathering of the nets.

I claim—

1. A torpedo guard mechanism, comprising out-riggers, a depending guard carrier pivoted on each out-rigger to swing at right angles thereto, and means to swing the guard carriers substantially parallel with the side of the ship to gather the guards.

2. A torpedo guard mechanism, comprising pivoted out-riggers, a depending guard carrier pivoted on each out-rigger and arranged to swing substantially parallel to the ship, and means to raise the guard carriers substantially in a plane parallel with the side of the ship, said means thereafter operating to raise the guard carriers and the outriggers.

3. A torpedo guard mechanism, comprising pivoted out-riggers, a depending guard carrier pivoted on each out-rigger and arranged to swing substantially parallel to the ship, and a hauling rope guided at one outrigger and connected at the lower end of the guard carrier next to the rear thereof whereby the carrier will be first caused to rotate in the plane of the guard and thereafter raised.

4. A torpedo guard mechanism, comprising out-riggers, a depending guard carrier pivoted on each out-rigger to swing parallel to the ship, a hauling rope guided at one out-rigger and connected at the lower end of the guard carrier next to the rear thereof, and a link between the guard carriers.

5. A torpedo guard mechanism, comprising out-riggers, a plurality of depending guard carriers pivoted on each out-rigger to swing parallel to the ship, means to swing the guard carriers in planes substantially parallel with the side of the ship to gather the guards.

6. A torpedo guard mechanism, comprising outriggers, a plurality of depending guard carriers pivoted on each outrigger to swing parallel to the ship, the outermost guard carrier arranged to yield toward the ship, and means to raise the guard carriers in substantially their own parallel planes.

7. A torpedo guard mechanism, comprising pivoted outriggers, a plurality of depending guard carriers pivoted on each outrigger to swing in planes perpendicular to the outriggers, the outermost guard carrier arranged to yield toward the ship, and means to raise the guard carriers in substantially their own parallel planes, whereby all of the carriers will be brought substantially into a horizontal plane.

8. A torpedo guard mechanism, comprising pivoted out-riggers, a plurality of depending guard carriers pivoted on each outrigger to swing in planes perpendicular thereto, the outmost guard carrier arranged to yield toward the ship, a rod connecting the ends of the guard carriers of a single pair of out-riggers together, and flexible holding means between the rods for adjacent carriers of the several out-riggers.

9. A torpedo guard mechanism, comprising out-riggers, a plurality of parallel guard carriers pivotally connected to the out-riggers to swing in planes perpendicular thereto, and a pivoted brace also connected to each out-rigger, said brace and carriers connected together at their lower ends and provided at their upper ends with means for limiting their pivotal movement in one direction.

10. A torpedo guard mechanism, comprising pivoted out-riggers, a plurality of parallel guard carriers pivotally connected to the out-riggers to swing in planes perpendicular thereto, and a pivoted brace also connected to each out-rigger, said brace and carriers connected together at their lower ends and provided at their upper ends with means for limiting their pivotal movement in one direction, said out-riggers having means thereon for limiting the rising movement of the carriers and brace about their pivots, and means for moving the carriers about their pivots.

11. The combination with a torpedo guard carrier having a slot therein, said carrier pivoted to swing from a vertical to a horizontal position, of a pair of rollers mounted to slide in said slot, a connecting member between the rollers, and means for securing the guard to said member.

12. The combination with a pair of parallel shafts, means to separately actuate said shafts, and a plurality of winding drums on each shaft; of an out-rigger pertaining to each drum pivoted to swing in a vertical plane, a torpedo guard carrier pivoted to each out-rigger to swing in a plane at right angles thereto, and a rope passing from each drum to an out-rigger and thence to the lower end of each carrier next behind.

In testimony that I claim the foregoing as my invention, I have signed my name.

P. R. OVERLIN.

Witnesses:
THOMAS A. ROBERTS,
JOE W. NIEHAUS.